Figure 1:
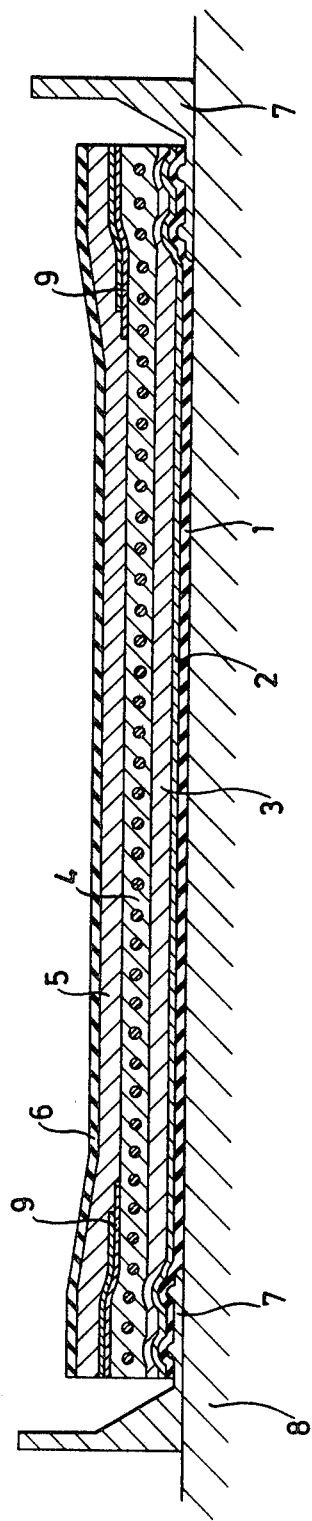

United States Patent [19]

Henry

[11] 4,192,351
[45] Mar. 11, 1980

[54] VARIABLE FLEX HOSE

[75] Inventor: Brian Henry, Portadown, Northern Ireland

[73] Assignee: The Goodyear Tire & Rubber Company, Akron, Ohio

[21] Appl. No.: 904,179

[22] Filed: May 8, 1978

[30] Foreign Application Priority Data

Jul. 25, 1977 [GB] United Kingdom ............... 31191/77

[51] Int. Cl.² ...................... B31C 13/00; F16L 11/12
[52] U.S. Cl. ..................................... 138/126; 138/130; 138/137; 138/138
[58] Field of Search ............... 138/126, 130, 125, 126, 138/127, 138, 109, 137

[56] References Cited

U.S. PATENT DOCUMENTS

| 2,911,236 | 11/1959 | Thibault | 138/130 |
| 3,548,884 | 12/1970 | Ambrose | 138/137 |
| 3,933,554 | 1/1976 | Torghiele | 138/138 |

Primary Examiner—Willis Little
Attorney, Agent, or Firm—D. M. Ronyak

[57] ABSTRACT

A large bore hose structure exhibiting variable flexibility throughout its length incorporates at least one reinforcement ply of a weftless cord fabric having wrap cords lying parallel to the hose longitudinal axis, encircling the hose and extending the full length thereof and at least one reinforcement ply of a weftless cord fabric having warp cords lying parallel to the hose longitudinal axis, encircling the hose and extending but for a portion of the length of the hose.

13 Claims, 2 Drawing Figures

VARIABLE FLEX HOSE

This invention generally relates to hose and more specifically to large bore material conveying hose and is particularly applicable to oil suction and discharge hose and dredge hose.

In recent years S.P.M. (single point mooring) systems have been extensively used for oil tankers to discharge or load oil to or from the mainland at an anchorage point far out to sea. This facility permits a moored ship to weathervane around the mooring in response to the forces of wind and sea conditions. The S.P.M. facilities utilize hose systems in one form or another to convey the oil and the principal design and operating conditions generally apply to all S.P.M. systems. In the CALM (Caternary Anchor Leg Mooring) system, the oil tanker is moored to a buoy having two relatively rotatable sections, one section secured to the sea bed, and the other section providing an anchorage point for the mooring line and for the oil hose which will be connected to the ship. A buoy construction of this type allows a moored tanker to swing freely under the influence of tide and wind without oil flow through the hose being interrupted. However, it is known that the two relatively rotatable sections of the buoy may become jammed and when this occurs, a moored tanker will continue to swing freely due to the flexibility of the mooring line. The hose, in following this movement, will flex near its point of anchorage at the buoy and this may cause the hose to rupture. Excessive flexing and rupturing may also occur due to continued wave action.

To solve this problem, it has been proposed to make a multi-section hose extending between the buoy and the tanker, having a substantially rigid section coupled to the buoy and a relatively flexible section at the other end. This increased rigidity will resist the load and will cause the bending to be spread along the hose length to the more flexible end without rupture caused by either kinking or fatigue.

The submarine hoses connected to the buoy and the pipeline end manifold are also severely flexed at their point of anchorage, depending on sea and weather conditions, and again failure of the hose may occur. For use at these end sections, it has been proposed to make the hoses substantially rigid at one end and relatively flexible at the other end thus increasing the working life of the hoses.

In the SALM (Single Anchor Leg Mooring) system, the mooring buoy is anchored to a base on the sea floor through a pre-tensioned single anchor leg consisting of a pipe riser pivoted on a universal joint and a short anchor chain with chain swivel. Oil passes from the base through the pipe to a submereged swivel housing at the top of the riser. Loading hose connected to the housing rises to the surface some distance from the buoy and floats to the side of the moored tanker. The tanker is free to weathervane and the swivel at the top of the riser rotates in order that the hoses are not damaged by becoming twisted or tangled in the submerged structure.

The force to rotate the swivel is transmitted by the submarine hose which must therefore be relatively stiff. The total number of these specially stiff hoses and their required stiffness depends on the particular design of swivel and the depth of water in which the hoses are operating. For use between the specially stiff submarine hose and the relatively flexible floating hose a hose of variable stiffness, substantially rigid at one end and relatively flexible at the other end, is required.

In most SPM systems as hereinbefore described, a number of lengths of hose are used and generally these are coupled together by means of metal flanges. The flanges are connected to the individual hoses by the use of built-in rigid nipples consisting of a short length of pipe. At each hose end therefore, the hose will tend to flex at the anchorage point between it and the nipple with subsequent hose failure and loss of oil.

Figure 2:
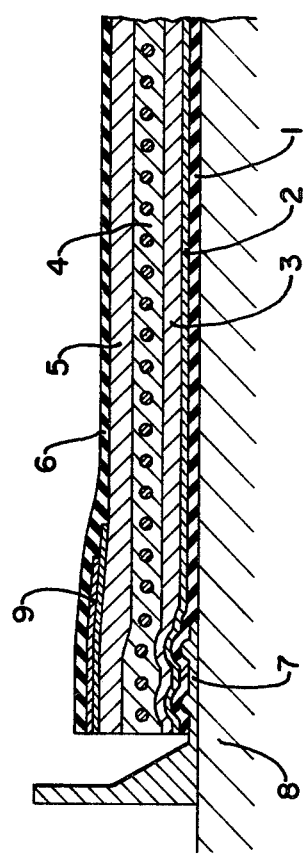

FIG. 1 of the drawing is a partial axial sectional view of an embodiment of a hose according to the invention;

FIG. 2 of the drawing is a fragmentary sectional view of a second embodiment of a hose according to the invention.

This invention therefore is directed to a new and improved hose having either a constant increased stiffness or variable flexibility along the length of the hose or indeed any desired level of stiffness at any position along its length. In accordance with the invention the stiffness, or extra stiffness, is obtained by using a layer of reinforcement comprising at least one ply of cord reinforcing material of which the cords extend the whole or part of the length of the hose and completely around the hose and are substantially parallel to the longitudinal axis of the hose body.

The variation in the number and lengths of the plies gives a variation in hose flexibility. Lengths of cord extending the whole hose length give the hose an increased constant stiffness.

Each ply is preferably of a weftless cord reinforcing fabric or other material, coated with elastomeric material, and the fabric or material is applied to the hose in bands extending along whole or part of the length of the hose and parallel to it. Alternatively, the rubber may be applied separately to the cord ply or plies. As used herein, the term "cord" is intended to include thread, filament, wire, cable, yarn and the like.

The cord reinforcing material is preferably an extensible cord having high tensile modulus. Varying the cord modulus will vary the degree of flexibility or increased stiffness. An example of such a cord is a 210 filament 6.6 nylon 3 ply 1400 Decitex of the type manufactured by I.C.I. Fibres Limited of Great Britain.

The increased stiffness obtained by the addition of the longitudinally applied cord plies may, in certain circumstances, result in an increased tendency for the hose to kink or collapse. This is caused by the increased bending stresses and shearing forces which are set up in the hose wall. In order to withstand these forces and to resist kinking, this type of hose is generally circumferentially reinforced by rigid rings or the application of spirally wound high tensile steel wire or other such means. Therefore, in addition to the longitudinally applied cord plies, extra circumferential reinforcement may be required for certain applications.

The plies of cord reinforcing material may be positioned either above or below the circumferential reinforcement.

The use of longitudinal cords for increasing the hose stiffness has many advantages over the traditional hose building methods. Extra or variable stiffness is normally introduced by increasing the amount of circumferential reinforcement at the normal reinforcement winding angles of 45°–55°, or changing the angles of various fabric or wire plies, but it has not been proposed to alter this angle to 0° as suggested herein. The application of longitudinal cord plies results in the most efficient use of these plies thus reducing the number required to obtain a specified stiffness. Generally, when compared to other hose building methods, this produces a much lighter hose which can be fabricated more quickly.

Construction of a hose according to the invention will now be described in more detail by way of example only with reference to the accompanying drawing which shows an axial cross section through half of a specific hose. The hose is built up on a mandrel 8 in a substantially conventional manner. In this particular example the hose is of 23¼ inch diameter and is 30 feet long, but it will, of course, be apparent that the principles of the invention may be applied to hose of other dimensions. The nipples 7 are preferably first prepared in a conventional manner; sandblasting, degreasing and cementing. The two nipples 7 are then set up at either end of the mandrel 8 with the required spacing between them, and are clamped to the mandrel. An inner body layer is preferably then built on to the mandrel, using conventional methods, in a number of stages entailing the application to the mandrel of a lining or tube 1 of rubber compound resistant to the material to be carried, a breaker layer 2 of three ply leno weave textile material coated with a suitable rubber compound, a burst reinforcement layer 3 comprising multiple plies of weftless wire cord impregnated with a suitable rubber compound, alternate plies being spiralled onto the hose in alternate directions and the cords in each ply making an angle of about 54° to the hose axis, and a layer 4 of circumferential reinforcement. The reinforcement 4 consists of two steel wires manufactured to BS 3592 each of 0.432 inches diameter spiralled on at a pitch of 1.432 inches and separated by two ply of leno weave textile material coated with a suitable rubber compound and completely imbedded in a suitable rubber.

Alternatively the circumferential reinforcement layer may comprise at least two plies of polyester monofilaments wound at opposite hand orientation.

The material giving the increased stiffness is then applied to the hose. At least two plies of end reinforcing material 9 and multiple plies of reinforcing material 5 preferably comprising weftless type cord skim coated with a suitable rubber compound are applied to the hose. All plies are applied completely around the hose with the warp parallel to the longitudinal axis of the hose body. The two end reinforcing plies 9 are of different lengths as for example 50 inches and 40 inches respectively and give a varying stiffness at the hose ends. The multiple reinforcing plies 5 extend over the complete hose length. Alternatively the material giving increased stiffness is applied to the hose as follows. The ply or plies (9) of weftless cord fabric having warp cords which extend but for a portion of the length of the hose is positioned in the hose structure between the weftless cord fabric (5) having warp cords which extend the full length of the hose and the outer cover ply (6).

In this particular hose construction the longitudinal cord plies are anchored along the complete length of the hose by adhesion to utilize the properties of the cord. Alternatively, the cords could be mechanically anchored at each end. The cord reinforcing materials preferably are covered by a cover layer 6 of suitable rubber compound.

After assembly as described the hose may be wrapped and cured in the conventional manner. It is found that the cured hose is relatively stiff, in the region of $9 \times 10^5$ lbs/ft$^2$.

The number of plies given in the foregoing description are purely exemplary and different numbers of plies may be used. The hose may be made even stiffer by using more plies of longitudinal cords or less stiff by using less plies. Therefore, the stiffness of a 23¼ inch diameter hose can be increased from about $1 \times 10^5$ lbs/ft$^2$ to $9 \times 10^5$ lbs/ft$^2$ by the addition of six plies of this particular longitudinally applied tire cord. The hose can also be made variably stiff within this range by reducing the length of each of the successive six plies. The construction of the body of the hose can be varied as desired. Thus, the burst reinforcement layer 3 can be of a textile material or wire cord. The body may be of a construction that includes rigid or flexible rings or monofilament polyester such as that sold by I.C.I. Fibres Limited under the name of Macrofil. The longitudinal cord plies 5 and 9 may be applied before the circumferential reinforcement 4 or anywhere in the overall construction.

Hose according to the invention can, if desired, be rendered variably stiff or variably flexible by altering the number of plies and varying the lengths at each of the cord plies 5. The hose can also be strengthened to resist kinking or collapsing by decreasing of varying the pitch of the helical body wires or rigid rings. The hose may also be rendered buoyant by any one of a number of methods. Thus the hose may be fitted with float location collars to which are attached, after manufacture, bead floats. Alternatively buoyancy material may actually be built into the hose body before curing or on to the hose body after curing. The buoyancy material may be applied to the full length of the hose. Also, according to the invention, the stiffness may be varied by altering the modulus of the longitudinal cord.

While certain representative embodiments and details have been shown for the purpose of illustrating the invention, it will be apparent to those skilled in the art that various changes and modifications may be made therein without departing from the spirit or scope of the invention.

What is claimed is:

1. A large bore suction and discharge hose structure of elastomeric material exhibiting a variable flexibility comprising:

a hose body including a radially innermost elastomeric liner tube, a breaker ply of textile fabric radially outwardly of the liner tube, and at least two reinforcement plies of cord fabric wound at opposite hand orientation radially outwardly of the liner tube;

at least one reinforcement ply of a weftless cord fabric the cords of which lie substantially parallel to the longitudinal axis of the hose, said ply encircling and extending the full length of the hose body;

at least one reinforcement ply of a weftless cord fabric the cords of which lie substantially parallel to the longitudinal axis of the hose, said ply encircling the hose body and extending but for a portion of the length of the hose body; and a radially outermost elastomeric cover ply; all of said plies being vulcanized into an integral hose structure.

2. A hose structure as claimed in claim 1 wherein the weftless cord fabric having cords extending but for a portion of the length of the hose have an origin at one end of the hose structure.

3. A hose structure as claimed in claim 1 wherein the weftless cord fabric having cords extending but for a portion of the length of the hose have origins at both ends of the hose structure.

4. A hose structure as claimed in claims 2 or 3 wherein the ply of weftless cord fabric having cords which extend but for a portion of the length of the hose is positioned in the hose structure between the hose body and the weftless cord fabric having cords which extend the full length of the hose.

5. A hose structure as claimed in claims 2 or 3 wherein the ply of weftless cord fabric having cords which extend but for a portion of the length of the hose is positioned in the hose structure between the weftless cord fabric having cords which extend the full length of the hose and the outer cover ply.

6. A hose structure as claimed in claims 2 or 3 wherein the weftless cord fabric having cords which extend but for a portion of the length of the hose comprises multiple plies and wherein the cords of each such ply extend for varying lengths within the hose structure.

7. A hose structure as claimed in claim 1 further including a circumferential reinforcement ply.

8. A hose structure as claimed in claim 7 wherein the circumferential reinforcement ply comprises at least two plies of polyester monofilaments wound at opposite hand orientation.

9. A hose structure as claimed in claim 7 wherein the circumferential reinforcement ply comprises at least two windings of steel wire spiralled at opposite hand orientation and separated by an elastomeric impregnated leno weave textile fabric.

10. A hose structure as claimed in claim 9 wherein the wires are spiralled at a pitch of 1.432 inches.

11. A large bore suction and discharge hose structure exhibiting a variable flexibility comprising;
an inner elastomeric liner tube;
a breaker layer of three ply leno weave textile material adjacent the liner tube;
a burst reinforcement layer of multiple plies of a weftless cord impregnated with an elastomer, alternate plies being spiralled opposite hand at an angle of about 54 degrees with respect to the hose longitudinal axis;
a circumferential reinforcement layer of multiple plies of cord having a high tensile modulus adjacent the burst reinforcement layer;
at least one reinforcement ply of a weftless cord fabric having cords lying parallel to the longitudinal axis of the hose, encircling the hose and extending but for a portion of its length;
at least one reinforcement ply of a weftless cord fabric having cords lying parallel to the hose longitudinal axis, encircling the hose and extending the full length thereof; and
an elastomeric cover ply, all of said plies being vulcanized into an integral hose structure.

12. A hose structure as claimed in claim 11 wherein the circumferential reinforcement comprises rigid rings.

13. The hose structure as claimed in claim 11 wherein at least one of the plies of weftless cord fabric having cords lying parallel to the hose longitudinal axis comprises cords of varying tensile modulus.

* * * * *